(12) United States Patent
Langford et al.

(10) Patent No.: US 9,780,616 B2
(45) Date of Patent: Oct. 3, 2017

(54) WINDING INSULATION ARRANGEMENT FOR AXIAL FLUX MACHINES

(71) Applicant: Regal Beloit Australia, Pty. Ltd., Rowville (AU)

(72) Inventors: Charles Richard Langford, Grays Point (AU); Steven Peter Camilleri, Darwin (AU); Rafal Pawel Rohoza, Surrey Hill (AU)

(73) Assignee: Regal Beloit Australia Pty. Ltd., Rowville, Victoria (AU)

( * ) Notice: Subject to any disclaimer, the term of this patent is extended or adjusted under 35 U.S.C. 154(b) by 261 days.

(21) Appl. No.: 14/665,995

(22) Filed: Mar. 23, 2015

(65) Prior Publication Data
US 2015/0229177 A1    Aug. 13, 2015

Related U.S. Application Data

(62) Division of application No. 13/121,593, filed as application No. PCT/AU2009/001290 on Sep. 29, 2009, now abandoned.

(30) Foreign Application Priority Data

Sep. 29, 2008 (AU) ............................... 2008905057

(51) Int. Cl.
*H02K 3/34* (2006.01)
*H02K 1/14* (2006.01)
(Continued)

(52) U.S. Cl.
CPC ............. *H02K 3/345* (2013.01); *H02K 1/146* (2013.01); *H02K 3/522* (2013.01); *H02K 15/024* (2013.01);
(Continued)

(58) Field of Classification Search
CPC .. H02K 1/14; H02K 1/18; H02K 1/27; H02K 3/52; H02K 5/08; H02K 7/08; H02K 7/14; H02K 9/00; H02K 21/24; H02K 29/03
(Continued)

(56) References Cited

U.S. PATENT DOCUMENTS 6,346,759 B1 *  2/2002  Suzuki ................... H02K 1/146
                                                     310/429
6,611,076 B2 *  8/2003  Lindbery ............... H02K 1/165
                                                     310/214
(Continued)

FOREIGN PATENT DOCUMENTS

EP    1026809 A2    8/2000
EP    1096642 A2    5/2001
(Continued)

OTHER PUBLICATIONS

First Chinese Office Action, Application No. 200980137807.7, dated Jan. 21, 2013, pp. 10.
(Continued)

*Primary Examiner* — Tran Nguyen
(74) *Attorney, Agent, or Firm* — Armstrong Teasdale LLP

(57) ABSTRACT

A stator 20 for an axial flux machine such as a motor or generator. The stator includes a stator core 32 having a back plane 24 which in use is disposed perpendicularly about a rotational axis of the machine. A plurality of teeth 26 extend axially from the back plane so as to form winding receiving slots 28 between adjacent teeth. The stator also includes an electrical winding 30 including a plurality of coils 32, each coil being located about a tooth of the stator core and being electrically isolated from the stator tooth by means of an insulating former 34 having a shape which closely conforms to the shape of the stator tooth. The coils 32 are intercon-
(Continued)

nected to form the winding 30. A method of constructing a stator is also disclosed.

17 Claims, 7 Drawing Sheets

(51) Int. Cl.
*H02K 3/52* (2006.01)
*H02K 15/02* (2006.01)

(52) U.S. Cl.
CPC ..... *H02K 2203/06* (2013.01); *H02K 2203/12* (2013.01); *Y10T 29/49009* (2015.01)

(58) Field of Classification Search
USPC .................................. 310/194, 265, 267, 268
See application file for complete search history.

(56) References Cited

U.S. PATENT DOCUMENTS

| | | | | |
|---|---|---|---|---|
| 7,122,933 | B2* | 10/2006 | Horst | ........................ H02K 3/18 310/179 |
| 2004/0164641 | A1 | 8/2004 | Yamada et al. | |
| 2005/0017596 | A1 | 1/2005 | Naito et al. | |
| 2005/0073213 | A1 | 4/2005 | Naito et al. | |
| 2006/0103263 | A1* | 5/2006 | Naito | ...................... H02K 1/148 310/268 |
| 2006/0244333 | A1* | 11/2006 | Jeung | ...................... H02K 29/03 310/186 |
| 2007/0018528 | A1 | 1/2007 | Naitou et al. | |
| 2008/0106161 | A1* | 5/2008 | Matsuzaki | ............. H02K 3/524 310/71 |

FOREIGN PATENT DOCUMENTS

| | | |
|---|---|---|
| EP | 1450464 A1 | 8/2004 |
| EP | 1921731 A2 | 5/2008 |
| JP | 11122855 A | 4/1999 |
| JP | 2008187880 A | 5/2008 |

OTHER PUBLICATIONS

Second Chinese Office Action, Application No. 200980137807.7, dated Sep. 22, 2013, pp. 5.
Third Chinese Office Action, Application No. 200980137807.7, dated Apr. 15, 2014. pp. 16.
Fourth Chinese Office Action, Application No. 200910137807.7, dated Oct. 27, 2014, pp. 24.
European Communication, Application No. 09 815 503.9, dated Jan. 15, 2014, pp. 3.
European Search Report, Application No. 09815503.9, dated Dec. 3, 2012, pp. 7.
European Communication, Application No. 09 815 503.9, dated Aug. 28, 2013, pp. 4.
International Search Report and Written Opinion, Application No. PCT/AU2009/001290, dated Dec. 7, 2009, pp. 8.
Japanese Office Action, Application No. 2011-528142, dated Jan. 20, 2015, pp. 11.

* cited by examiner

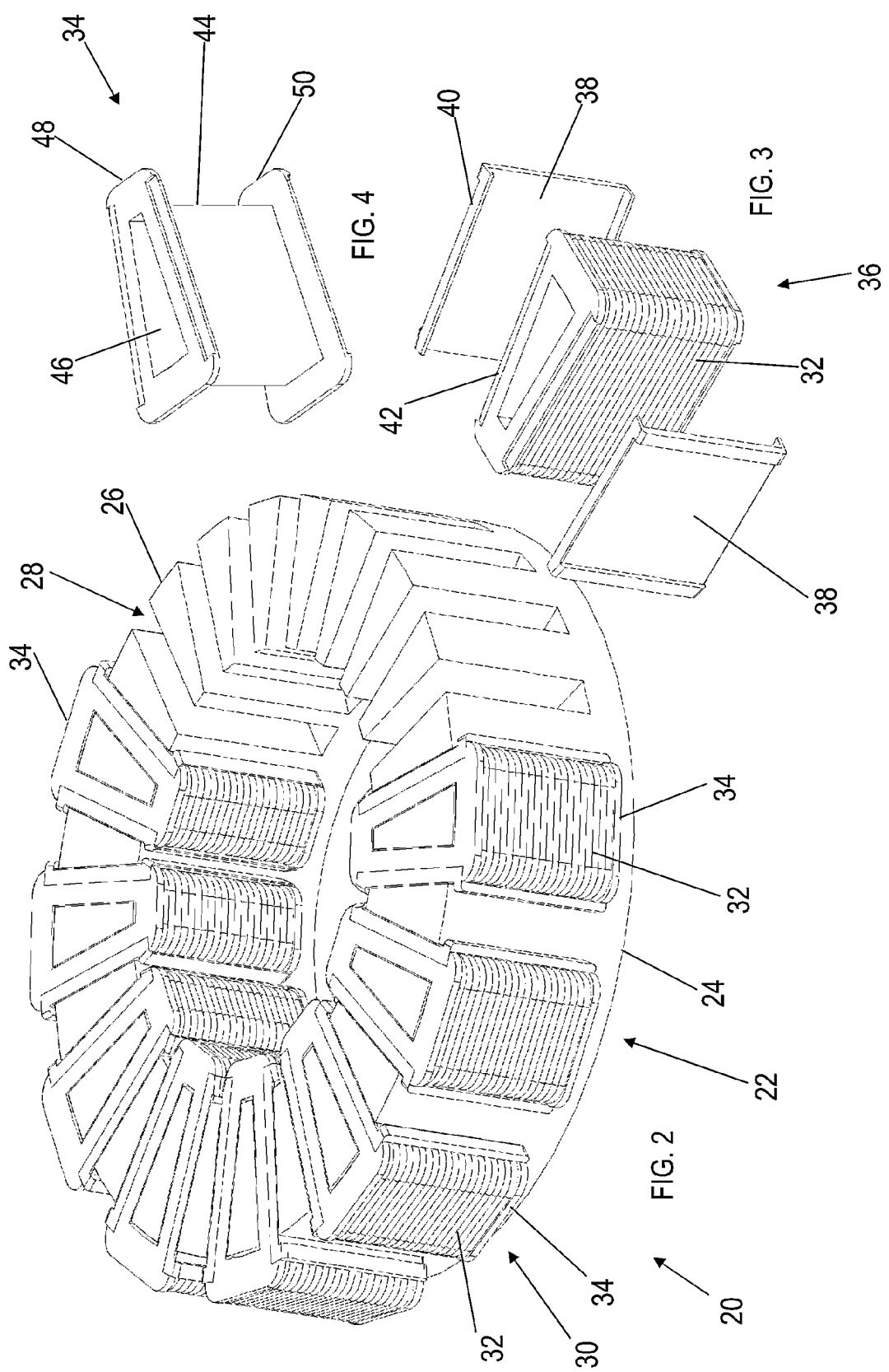

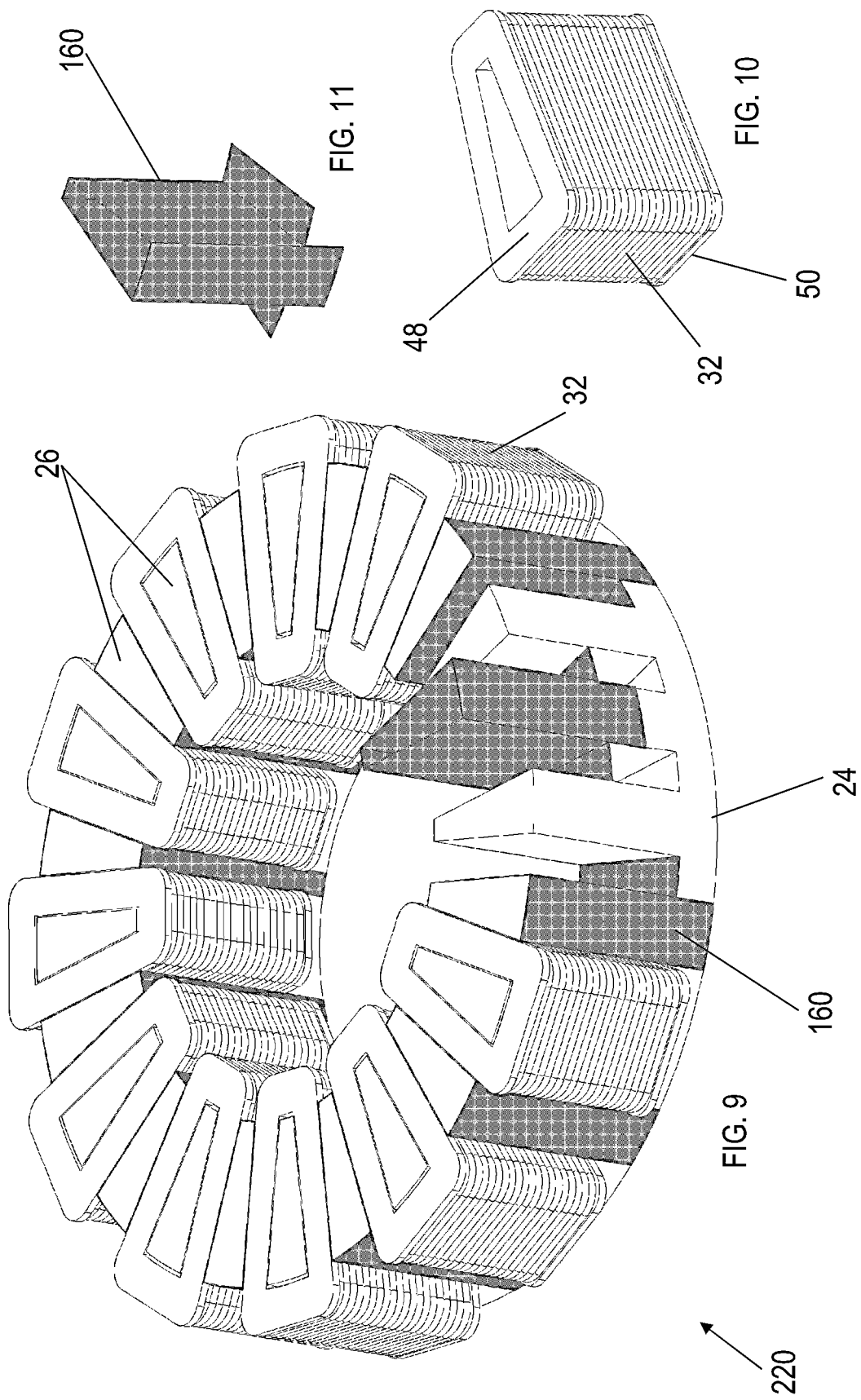

WINDING INSULATION ARRANGEMENT FOR AXIAL FLUX MACHINES

CROSS-REFERENCE TO RELATED APPLICATIONS

This application is a division of U.S. patent application Ser. No. 13/121,593 filed May 19, 2011, currently pending, which is a 35 U.S.C. §371 National Stage Application of PCT/AU2009/001290, filed Sep. 29, 2009, which claims priority to Australian Patent Application No. 2008905057, filed Sep. 29, 2008, each of which are hereby incorporated by reference in their entirety.

FIELD OF THE INVENTION

The present invention relates generally to electrical machines such as electric motors and generators. In particular, the invention concerns an insulation arrangement for an electrical winding in an axial flux machine with a slotted core. It will be convenient to describe the invention in relation to axial flux motors, as this would be the most common application for the insulation arrangement, but it should be understood that the invention is equally applicable to axial flux generators.

BACKGROUND OF THE INVENTION

A motor stator typically includes a laminated electrical steel structure with slots to allow the insertion of conductive windings, typically made from enameled copper wire. As the stator steel is quite conductive itself, an insulating material is typically added as a lining to the stator slots to prevent electrical current flowing between the copper winding and the steel stator. The material might typically be a sheet of polyester film, such as Mylar® produced by Dupont Teijin Films, perhaps in a sandwich structure with other materials such as Dacron® produced by Invista Technologies. This material must be formed in such a way as to electrically isolate the winding from the stator. In most cases, the material is also bent back over itself at the ends (or "cuffed") in order to ensure that a minimum air clearance between copper and steel is met. The copper windings are also typically held in place with thicker Mylar® wedges which are driven into the tops of the slots once the copper is inserted. The "end turn" portion of the copper winding which protrudes from the stator is held in place by tying it with string.

A typical example of this prior art stator arrangement is shown, in part, in FIG. 1 of the accompanying drawings. In this example, a motor stator 1 includes a laminated stator core 3 and winding coils 5 wound about teeth of the stator core 3. The winding coils 5 are electrically isolated from the stator core 3 by a layer of insulating material 7. This material is formed with cuffs 9 at each end of the stator core teeth so as to maintain integrity of the electrical isolation.

The "wiring rules" (for example AS60335.1 for household appliance motors in Australia) specify that a certain minimum clearance distance be maintained between the surface of the "uninsulated" copper wire and the surface of the steel stator core (the wiring rules do not count the usual enameled coating on the copper wire as insulation). Thus, in this example, a clearance distance 11 is provided to establish this minimum required distance between the "uninsulated" copper wire surface and the steel stator core surface.

This means that the coils of the winding 5 are longer than they actually need to be—the wire goes straight through the slot and continues in a straight line through the cuffed portion 9 of the insulator 7 before turning over into another slot of the stator core 3. The coils of the winding 5 are thus enlarged to make sure the minimum clearance requirement can be met.

Some disadvantages of this conventional winding/insulation arrangement are as follows:

It is complicated. Each slot must have a well positioned slot liner (possibly with cuffed ends) and a slot wedge. Typically, the windings would also be "tied in" to the stator with string to hold them in place.

It is difficult to achieve a good result. Processes must be tightly controlled; issues such as single wires slipping under the insulation, the wedges not properly retaining the winding and the cuffs not correctly locating the winding within the allowed clearance can occur.

The winding process is expensive due to the number of process steps and checking that must occur.

Some winding material is included unnecessarily, at the cost of motor efficiency, due to the additional material required to meet the minimum clearance requirement.

With the foregoing in mind, there remains a need for an insulation arrangement for axial flux machines which is more convenient, facilitates assembly, reduces waste and improves efficiency of electrical machines compared to prior art arrangements.

SUMMARY OF THE INVENTION

One aspect of the present invention accordingly provides a stator for an axial flux machine. The stator includes:

a stator core having a back plane which in use is disposed perpendicularly about a rotational axis of the machine, and a plurality of teeth extending axially from the back plane so as to form winding receiving slots between adjacent teeth; and an electrical winding including a plurality of coils, each coil being located about a tooth of the stator core and being electrically isolated from the stator tooth by means of an insulating former having a shape which closely conforms to the shape of the stator tooth, the coils being interconnected to form the winding.

The use of an insulating former serves to avoid the need for the clearance distance which must be maintained in prior art arrangements. To this end, the former closely conforms to the shape of the stator tooth so as to enable the mean length of turn of the winding coils to be reduced. This decreases the resistance of the windings, decreases material use (and cost) and improves efficiency of the machine.

In the present context, the phrase "closely conforms" is intended to mean that the insulating former fits over a tooth of the stator core with minimal gap between the tooth and the former, and the thickness of the former between the stator tooth and the copper winding is minimised. Preferably, each stator core tooth has a substantially trapezoidal shape and each winding receiving slot has substantially parallel side walls. In this way, the winding coils substantially fill the slots between the teeth, leading to even greater efficiency and reduced overall cost.

In a preferred embodiment, each insulating former includes a sleeve having a tooth receiving opening therethrough and a pair of flanges extending outwardly from the sleeve. One flange is located at each end of the sleeve and the coil is wound between the flanges. In this way, each coil of the electrical winding can be wound about the insulating former before it is placed upon a tooth of the stator core. This technique significantly assists the assembly of the machine stator.

Advantageously, the tooth receiving opening of each sleeve has a substantially trapezoidal shape, so as to closely conform to the trapezoidal shape of the tooth upon which it is located. The side walls of the sleeve should also be made as thin as possible, subject to physical rigidity and electrical insulation requirements, so as to reduce the mean turn length of the winding coils as much as possible.

The length of each insulating former is preferably made substantially equal to the length of the stator teeth. In this way, their free ends will substantially align within a plane parallel to the back plane.

In one embodiment, each insulating former includes, at an end facing the stator core back plane, a flexible clip configured to secure the insulating former to the back plane.

The insulating formers may also include a wiring channel at a radially outer side thereof to facilitate interconnection of the coils. In a multiphase machine, each insulating former could include a plurality of wiring channels arranged so as to guide conductors between successive coils of the same phase and electrically isolate them from coils of other phases and from the stator core.

In a preferred embodiment, each insulating former includes side covers configured to at least partially enclose the coil and electrically isolate it from adjacent side walls and/or adjacent coils. The side cover may include retaining clips which snap closed over the coil once wound. Alternatively, or in addition, the side covers may be hinged to a flange of the insulating former.

In an alternative embodiment, winding coils (with their insulating formers) are provided on every second tooth of the stator core and insulating sleeves surround intervening teeth so as to electrically isolate the coils from the side walls of the intervening teeth.

Another aspect of the present invention provides an axial flux motor having a stator as described above.

A further aspect of the invention provides a method of constructing a stator for an axial flux machine. The method including the steps of:

providing a stator core, the core having a back plane which in use is disposed perpendicularly about a rotational axis of the machine, and a plurality of teeth extending axially from the back plane so as to form winding receiving slots between adjacent teeth;

providing a plurality of insulating formers, each former being configured to closely conform to the shape of the stator teeth;

winding a coil about each former;

sliding each former onto a tooth of the stator core; and connecting the coils together to form an electrical winding.

To assist the further understanding of the invention, reference is now made to the accompanying drawings which illustrate preferred embodiments. It is to be appreciated that these embodiments are given by way of illustration only and the invention is not to be limited by this illustration.

BRIEF DESCRIPTION OF THE DRAWINGS

In the drawings:

FIG. 2 is a perspective view of a stator for an axial flux motor in accordance with a preferred embodiment of the present invention;

FIG. 3 is an exploded perspective view of a two part insulating former (with a coil wound thereon) as used in the stator of FIG. 2;

FIG. 4 is a perspective view of the body portion of the insulating former (without coil) shown in FIG. 3;

FIG. 9 is a perspective view of another stator for an axial flux motor in accordance with a further alternative embodiment of the present invention;

FIG. 10 is a perspective view of an insulating former (with coil) as used in the stator of FIG. 9; and FIG. 11 is a perspective view of an insulating sleeve as used in the stator of FIG. 9.

DETAILED DESCRIPTION OF PREFERRED EMBODIMENTS

Figure 1:
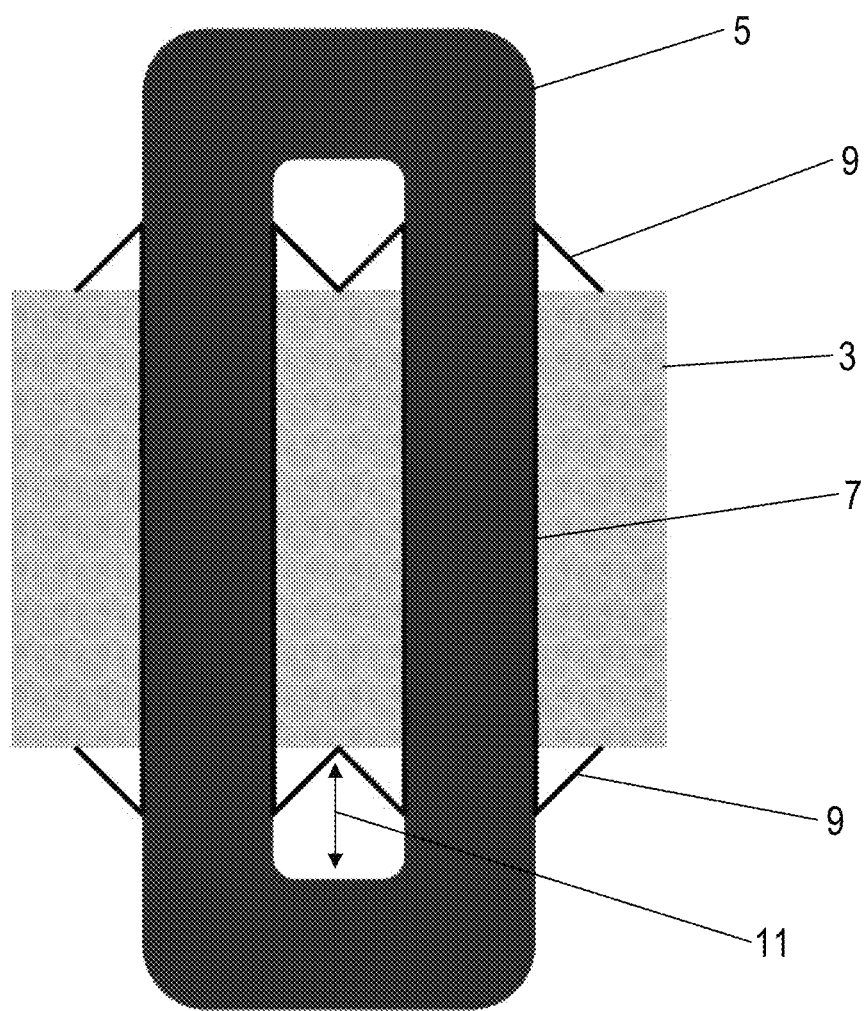
FIG. 1 is a diagrammatic representation of a portion of a prior art stator for an electrical machine.

Referring to the drawings, FIG. 2 shows a partly assembled stator for an axial flux motor in accordance with a preferred embodiment of the present invention. The Stator 20 includes a stator core 22 having a back plane 24 and a plurality of teeth 26 extending from the back plane 24. In use, the back plane 24 is disposed perpendicularly about a rotational axis of the electric motor and the teeth 26 extend axially from the back plane 24 and form winding receiving slots 28 between the teeth 26. The stator 20 also includes an electrical winding 30 made up of a plurality of coils 32 wherein each coil is located about a tooth 26 of the stator core 22. Each of the coils 32 are electrically isolated from their respective stator tooth 26 by means of an insulating former 34. As can be seen in the drawing, the internal shape of the insulating formers 34 closely conforms to the external shape of the stator teeth 26. Although not specifically shown in FIG. 2, each of the coils 32 are interconnected to form the overall electrical winding 30.

In the embodiment shown, every second tooth 26 of the stator core 22 includes a winding coil 32. As such, each slot 28 is almost entirely filled with the conductors belonging to a single coil 32 of the winding. However, in an alternative embodiment, not shown, it is possible that every tooth of the stator core includes a surrounding coil. In this embodiment, each of the slots would include conductors belonging to each of the two coils which surround the adjacent teeth.

As can be seen in FIG. 2, each tooth 26 is substantially trapezoidal in cross section, although the radially inner and radially outer edges may in fact be somewhat curved. Each slot 28 has substantially parallel side walls. Also, the length of each insulating former 34 is substantially equal to the length of the teeth 26 such that their free ends (their upper ends in the orientation shown in FIG. 2) substantially align within a plane parallel to the back plane 24. In use, this plane faces the rotor of the axial flux motor.

Turning now to FIG. 3, there is shown an exploded perspective view of an insulating former as used in the stator of FIG. 2. This insulating former is a two part former in that it includes a body portion 36 and two side covers 38. In this embodiment, the side covers 38 are configured to partially enclose the coil 32 and electrically isolate it from side walls of adjacent teeth 26 and/or from adjacent coils 32. Also, the side covers 38 include retaining clips 40 which cooperate with matching recesses 42 provided on the body portion 36 of the former.

FIG. 4 shows the body portion 36 of the insulating former 34 without the coil 32 in place. From this figure it will be appreciated that the former 34 includes a sleeve 44 having a tooth receiving opening 46 therethrough. This opening 46 has a trapezoidal cross section so as to closely conform to the trapezoidal shape of the teeth 26. The insulating former 34 also includes a pair of flanges 48 and 50 extending outwardly from the sleeve 44, with one flange 48 at an upper end of the sleeve 44 and the other flange 50 at the lower end of the sleeve 44 (with the insulating former in the orientation shown in FIG. 4).

Figure 5:
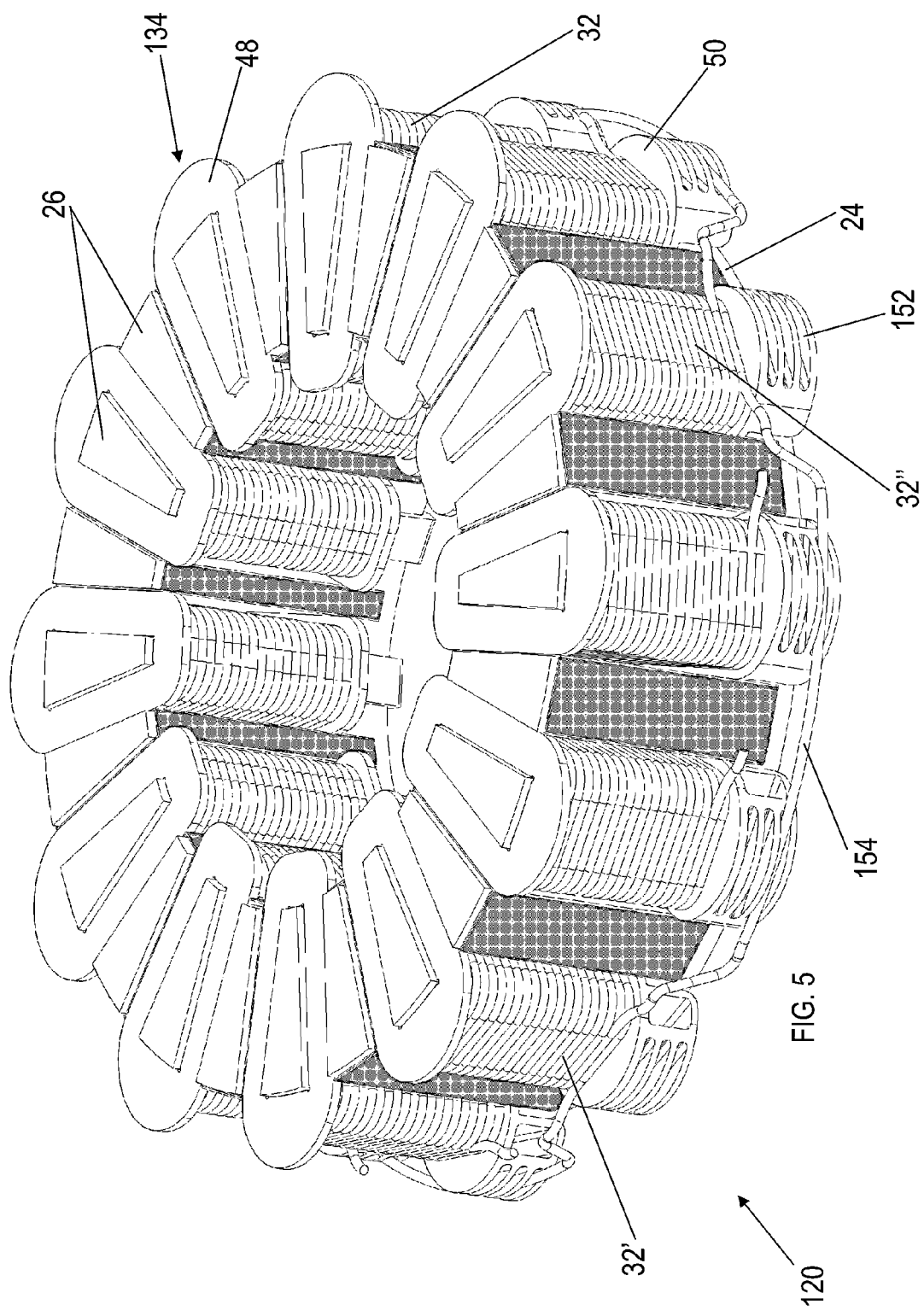
FIG. 5 is a perspective view of another stator for an axial flux motor in accordance with an alternative embodiment of the present invention.

Turning now to FIG. 5, there is shown another stator 120 for an axial flux motor in accordance with an alternative embodiment of the present invention. Similar reference numerals are used in this figure, and all subsequent figures, to denote features identical or similar to features shown in FIGS. 1 to 3. Thus, where these features are similar, they will not be described in detail.

In this embodiment, a stator 120 once again includes a stator core which is the same as that shown in FIG. 2. The stator also includes an electrical winding made up of a plurality of coils 32 which are interconnected. In this embodiment, the motor is a three phase motor such that every third coil 32 is connected. For example, coil 32' is connected to coil 32" of the same phase, and the two intervening coils are bypassed for this phase. These two coils instead belong to the other two phases of the three phase motor.

To facilitate the interconnection of the winding coils 32, each insulating former includes three wiring channels 152 at a radially outer side thereof. These channels are arranged so as to guide interconnecting conductors 154 between successive coils of the same phase and electrically isolate them from coils of other phases and from the stator core. Whilst not shown in FIG. 5, other coils of the winding are similarly interconnected.

Figure 6:
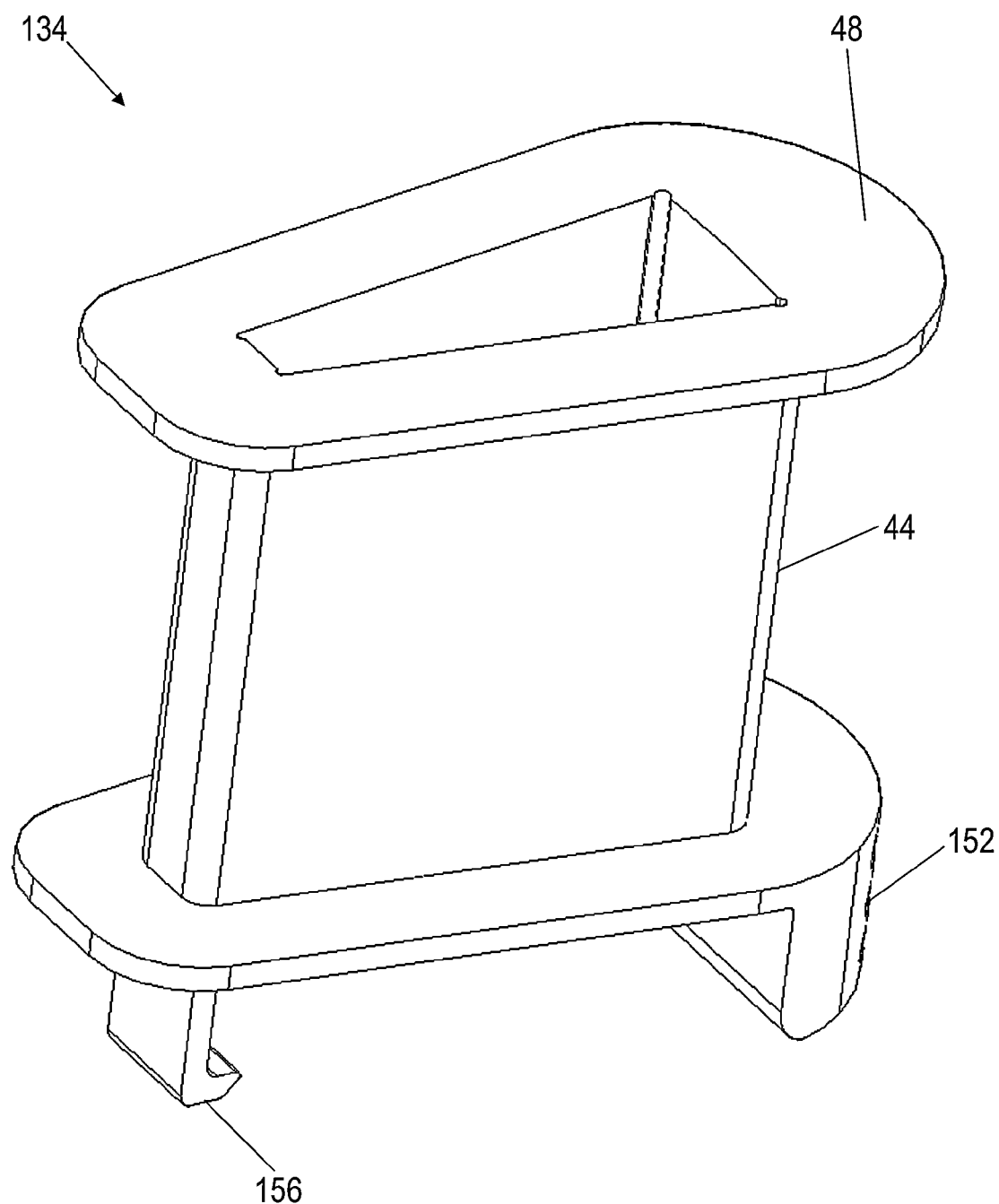
FIGS. 6 to 8 are various views of an insulating former as used in the stator of FIG. 5.
Figure 7:
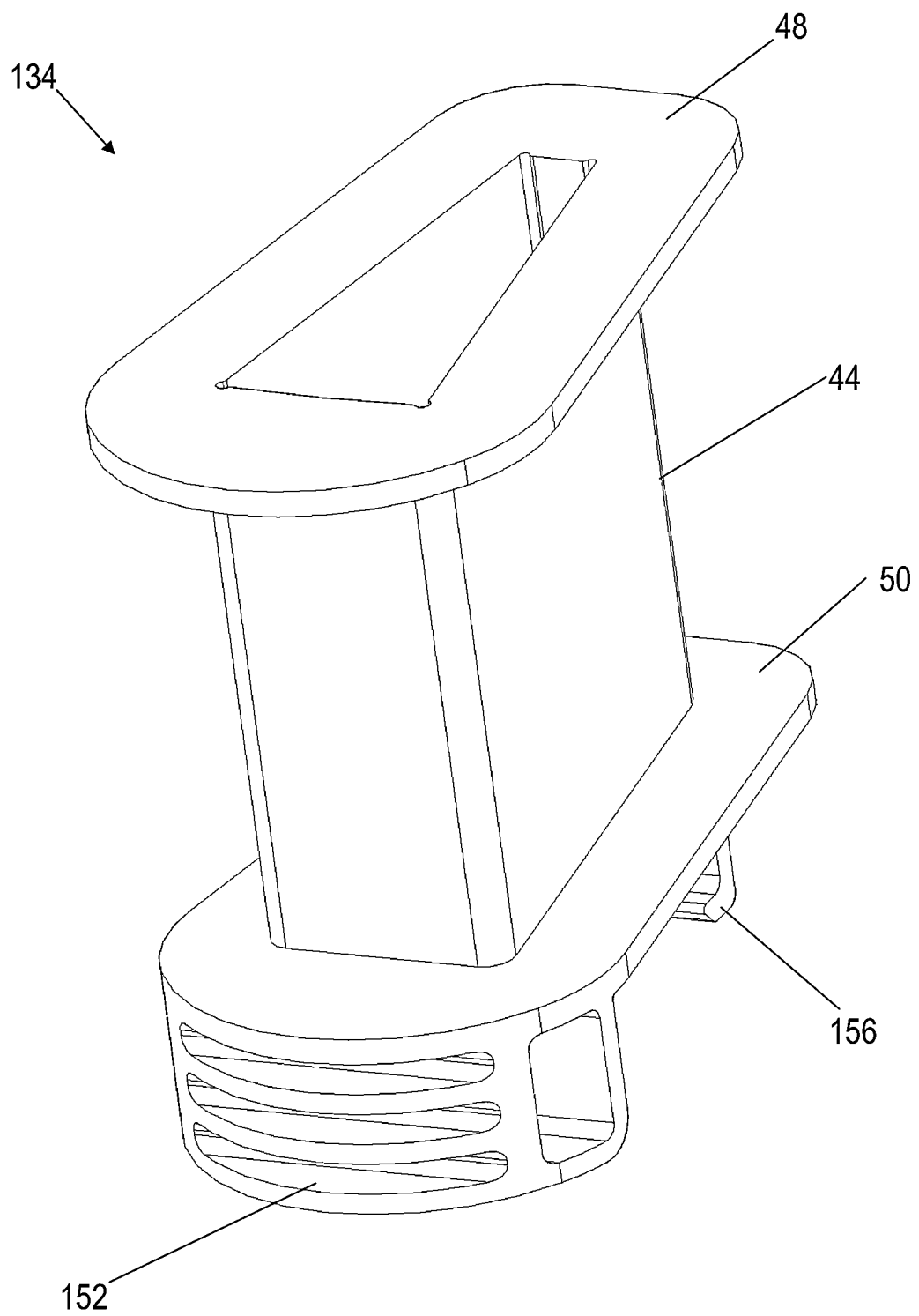
Figure 8:
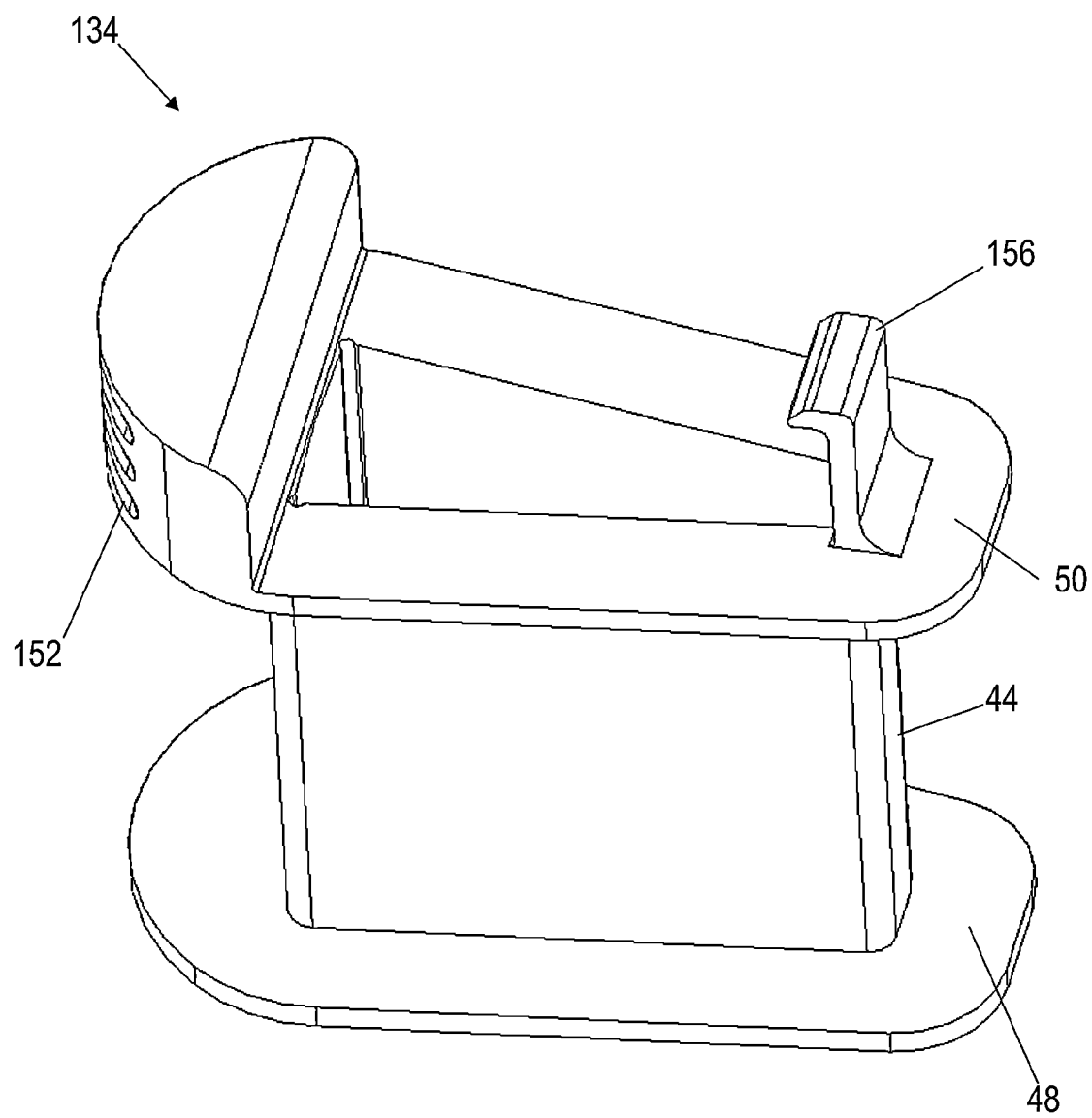

FIGS. 6 to 8 show an insulating former of the type used in the stator of FIG. 5. In particular, FIG. 6 shows a perspective view from an upper, inner radial position, FIG. 7 shows a perspective view from an upper, outer radial position, and FIG. 8 shows a perspective view from below. In each figure, it can be seen that the insulating former 134 includes a sleeve 44 with outwardly extending flanges 48 and 50, one at each end. Extending downwardly (in the orientation shown in FIGS. 6 and 7) from the flange 50, and on the radially outer side of the former 134, are the three wiring channels 152.

As can be best seen in FIGS. 6 and 8, the insulating former 134 also includes, at an end facing the stator core back plane 24, a flexible clip 156 arranged to secure the insulating former 134 to the back plane 24. This clip 156 may avoid the need for any further means for securing the insulting former 134 to the stator core.

Referring again to FIG. 5, it can be seen that each alternate stator core tooth 26 which does not include a winding coil 32 is wrapped with an insulating tape (represented by the black surface) so as to electrically isolate each coil 32 from the side walls of the teeth 26. It should be appreciated, however, that side covers of the type shown in FIG. 3 may alternatively be provided.

Referring now to FIG. 9, there is shown another stator 220 for an axial flux motor in accordance with a further alternative embodiment of the invention. Once again, similar reference numerals are used to denote similar features to those shown in the earlier drawings.

This embodiment is somewhat similar to that shown in FIG. 5 except that, instead of intervening teeth being wrapped in insulating tape, insulating sleeves 160 are provided. Every second tooth 26 includes a winding coil 32 and the intervening teeth are covered with the insulating sleeves 160. These sleeves serve to electrically isolate the outer surfaces of the coils 32 from side walls of the intervening teeth.

Finally, FIG. 10 shows an insulating former (including winding coil) as used in the stator 220 of FIG. 9 and FIG. 11 shows an insulating sleeve as also used in that stator.

It will be appreciated that in order to reduce the mean turn length of the winding coils, the sleeve 44 of each insulating former should be made as thin as possible, subject to a minimum thickness determined by strength and insulation requirements. Having said that, the inventors have found that a large proportion of the strength of the insulating former is actually provided by the end flanges 48 and 50 rather than by the sleeve 44. This means that the sleeve can be made relatively thin, for example in the range of 0.2 to 0.5 mm, and still provide adequate strength. The thickness required to meet the necessary electrical isolation requirement will also depend on the particular material used and the requirements of the wiring rules in the geographic region where the stator is to be used. The inventors have found that traditional polyester materials are suitable and it is considered well within the capabilities of a person skilled in the art to select an appropriate material for a particular electric motor.

To construct a stator for an axial flux motor in accordance with the present invention, a stator core of the type described above is first provided. Such a core has a back plane and a plurality of teeth extending from the back plane so as to form winding receiving slots between adjacent teeth. Insulating formers of the type described above, with or without side covers, are provided and a coil is wound on each former. It is also possible that several coils may be wound successively such that a "string of coils" is created. Each former, together with its coil, is then slid, in an axial direction, onto a respective tooth of the stator core. Finally, all the coils are connected together to form the electrical winding.

Based on the foregoing, it will be appreciated that some advantages provided by preferred embodiments of the invention are as follows:

It allows dramatic reduction in the amount of copper used by reducing the mean length of turn of the winding coils.

Assembly is simplified.

Reliability may be improved as the number of points for failure decreases.

The winding no longer needs to be "tied in" with string (as in the prior art arrangement)—the insulating formers hold the entire coil in place.

The winding no longer needs to be wedged in place (as in the prior art arrangement)—the insulating formers include a flexible clip at the end which snaps on to the back plane of the stator, securing it in place.

The coil to coil interconnections of the winding can run through a wiring channel around the circumference of the stator.

Overall diameter of the stator can be reduced or minimised.

Although preferred embodiments of the invention have been described herein in detail, it will be understood by those skilled in the art that variations may be made thereto without departing from the spirit of the invention or the scope of the appended claims.

The invention claimed is:

1. A stator for an axial flux machine, the stator including:
   a stator core having a back plane that, in use, is disposed perpendicularly about a rotational axis of the machine, and a plurality of teeth extending axially from the back plane and including a free end opposite the backplane, wherein a plurality of winding receiving slots are defined between adjacent teeth; and
   an electrical winding including a plurality of coils, each coil located about a stator tooth of the plurality of stator teeth and electrically isolated from the stator tooth by an insulating former having a shape that substantially conforms to a shape of the stator tooth and having side covers configured to at least partially enclose each coil and electrically isolate each coil from side walls of adjacent teeth, the coils interconnected to form the electrical winding, wherein each side cover comprises a groove configured to mate against an adjacent stator tooth of the plurality of stator teeth.

2. The stator of claim 1 wherein each stator tooth has a substantially trapezoidal shape and each winding receiving slot has substantially parallel side walls.

3. The stator of claim 2 wherein each insulating former includes a sleeve having a tooth receiving opening therethrough and a pair of flanges extending outwardly from the sleeve with one flange being located at each end of the sleeve, and wherein the coil is wound between the flanges.

4. The stator of claim 3 wherein the tooth receiving opening of the sleeve has a substantially trapezoidal shape so as to substantially conform to the substantially trapezoidal shape of the stator tooth that is inserted into the tooth receiving opening of the sleeve of the insulating former.

5. The stator of claim 1 wherein a length of each insulating former is substantially equal to a length of the stator teeth such that a free end of each insulating former is at substantially a same axial height with the free end of the stator tooth, wherein the free end of the insulating former and the free end of the stator tooth are within a plane parallel to the back plane.

6. The stator of claim 1 wherein the insulating former includes, at an end facing the stator core back plane, a fastener arranged to secure the insulating former to the back plane.

7. The stator of claim 1 wherein the insulating former includes at least one wiring channel at a radially outer side thereof to facilitate interconnection of the coils.

8. The stator of claim 7 wherein the machine is a multi-phase machine and the insulating former includes a plurality of wiring channels arranged so as to guide conductors between successive coils of the same phase and electrically isolate them from coils of other phases and from the stator core.

9. The stator of claim 1 wherein the insulating former comprises a flange having recesses and each side covers includes retaining clips that cooperate with the recesses and snap closed over the coil once wound.

10. The stator of claim 1 wherein the stator teeth comprise first teeth and second teeth, wherein the first teeth and the second teeth are alternately arranged around the stator core in a circumferential direction, the coils are provided on the second teeth and insulating sleeves of the insulating formers surround the second teeth so as to electrically isolate the coils from side walls of the second teeth.

11. A method of constructing a stator for an axial flux machine, the method including the steps of:
   providing a stator core, the stator core having a back plane that, in use, is disposed perpendicularly about a rotational axis of the axial flux machine, and a plurality of teeth extending axially from the back plane so as to define winding receiving slots between adjacent teeth, wherein each of the plurality of teeth includes a first end at the back plane and a second end opposite the back plane;
   providing a plurality of insulating formers, each of the insulating formers including an opening defined therein and configured to substantially conform to a shape of the stator teeth;
   winding a coil about each insulating former of the insulating formers;
   electrically isolating the coil from side walls of adjacent teeth by at least partially enclosing the coil with side covers of each insulating former of the insulating formers, wherein each side cover includes a groove configured to mate against an adjacent stator tooth of the plurality of stator teeth;
   sliding the second end of a tooth of the plurality of teeth into the opening of each former; and
   connecting the coils together to form an electrical winding.

12. The method of claim 11 further comprising coupling the side covers onto recesses of the insulating formers before sliding the teeth of the stator core into the openings.

13. The method of claim 11 wherein the stator teeth comprise first teeth and second teeth, wherein the first teeth and the second teeth are alternately arranged around the stator core in a circumferential direction, the insulating formers and associated coils are placed on the second teeth of the stator core, the method further comprising sliding insulating sleeves of the insulating formers onto the second teeth so as to electrically isolate the coils from the second teeth.

14. The stator of claim 1 wherein a cross section of each stator tooth, taken along a plane parallel to the back plane, is substantially uniform from the back plane to the free end of each stator tooth.

15. The stator of claim 1 wherein the coils wound around the insulating formers are inserted onto a one-piece stator core.

16. The method of claim 11 wherein each insulating former of the plurality of insulating formers includes a sleeve that defines the tooth receiving opening, a first flange at a first end of the sleeve and a second flange at a second end of the sleeve, wherein the first flange and the second flange provide structural support to the insulating former.

17. The method of claim 11 further comprising providing a stator core including a plurality of teeth extending axially from a backplane prior to sliding the former onto a tooth of the plurality of teeth.

* * * * *